S. G. MILLS.
Wheel-Cultivator.

No. 52,184. Patented Jan 23. 1866.

Witnesses:

Inventor:
Stephen G. Mills

UNITED STATES PATENT OFFICE.

STEPHEN G. MILLS, OF DES MOINES, IOWA.

IMPROVEMENT IN CULTIVATORS.

Specification forming part of Letters Patent No. 52,184, dated January 23, 1866.

*To all whom it may concern:*

Be it known that I, STEPHEN G. MILLS, of Fort Des Moines, in the county of Polk and State of Iowa, have made new and useful Improvements in Cultivators; and I do hereby declare the following to be a full, clear, and exact description of the nature, construction, and operation of the same sufficient to enable one skilled in the art to which it appertains to construct and use the same, reference being had to the accompanying drawings, which are made part of this specification, and in which—

Figure 1:
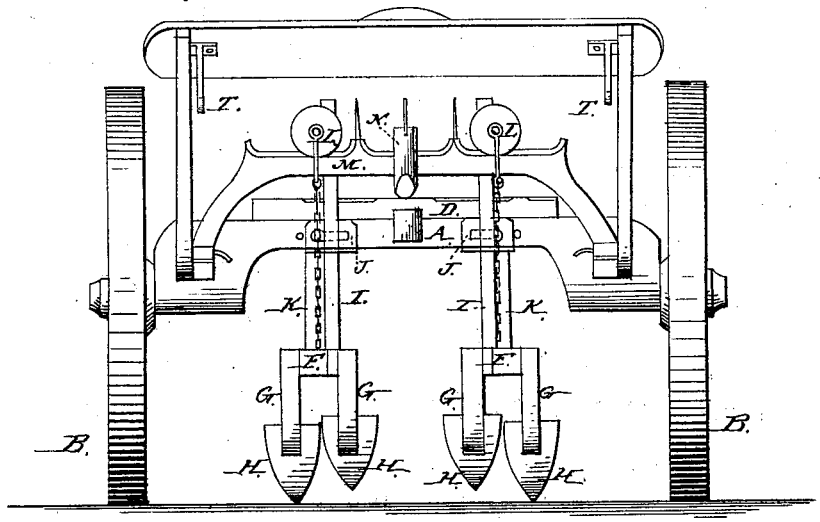
Figure 2:
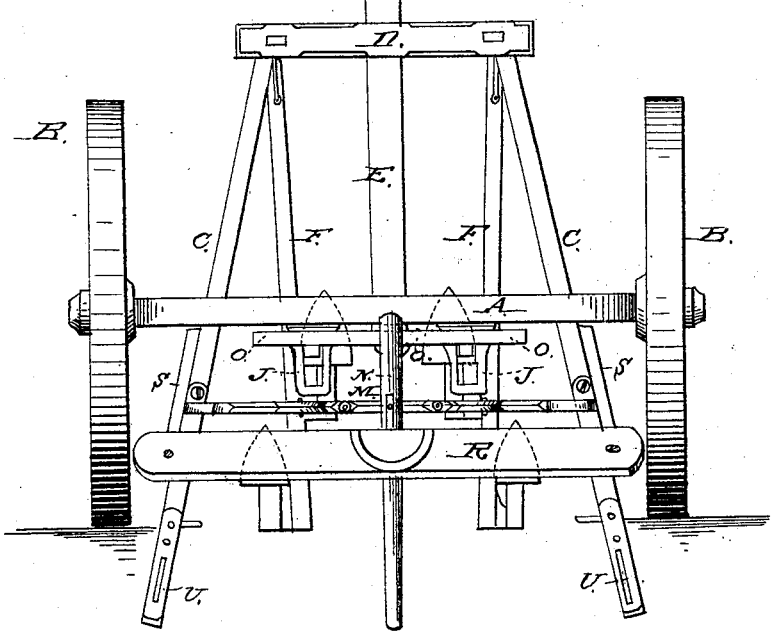

Figure 1 is a rear elevation of the machine. Fig. 2 is a plan or top view of the machine.

This improvement consists in the arrangement of the two vertically and laterally adjustable double-shovel plows, including the combination of devices by which they are supported, enabled to traverse laterally, and elevated at will.

In the drawings, A is the axle and B the wheel. C are the pieces shaped like ordinary wagon-hounds, and forming the frame of the cultivator in connection with the forward piece, D, which is secured to the tongue E, the latter being also fastened into the axle A.

Hinged at the intersection of the pieces C C with the piece D are two double-shovel plow-beams, F F, which carry beams G G and shovels or shares H H, and have vertical standards I I, which ascend through guides J J, attached to the axle, and are united by a crosspiece, O, which preserves their relative distance from each other.

M is a bridge-piece passing across between the pieces C C of the frame, and serving to support the plow-beams by means of the chains K K and the wheels L L, which have grooved peripheries and traverse the short angular tracks on the upper edge of the bridge M as the plow-beams are pushed laterally by means of the lever N, which is pivoted on the bridge and attached at its forward end to the bar O.

The seat-board R is attached to the frame by the pieces S S, and when down the arms T T occupy the slots U U in the frame C C; but the seat-board may be turned up, as in Fig. 1, so as to be out of the way when the driver of the team walks behind the machine. Fig. 2 shows the foot-board partially raised.

When the driver walks he operates the plows by means of the lever N, so far as lateral motion is concerned; but when he rides the lateral motion may be obtained by the lever or pressure of the feet on the plow-beams. The vertical adjustment is due to the chains K K. When riding, if one of the double plows chokes, by depressing the lever and setting the foot on the other plow-beam the choked plow is raised and the accumulated trash is allowed to drop.

Having described my invention, what I claim therein as new, and desire to secure by Letters Patent, is—

The arrangement of the pair of double-shovel plow-beams F, standards I, guides J, chains E, wheels L, bridge M, bar O, lever N, and shifting seat R, substantially as described and represented.

STEPHEN G. MILLS.

Witnesses:
   T. B. HILL,
   D. PERCIVAL.